US006751798B1

(12) United States Patent
Schofield

(10) Patent No.: US 6,751,798 B1
(45) Date of Patent: *Jun. 15, 2004

(54) METHOD AND APPARATUS FOR PERFORMING DISTRIBUTED OBJECT CALLS USING PROXIES AND MEMORY ALLOCATION

(75) Inventor: Andrew Schofield, Cham (CH)

(73) Assignee: 724 Solutions Software Inc., Santa Barbara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1116 days.

(21) Appl. No.: 08/680,266

(22) Filed: Jul. 11, 1996

(51) Int. Cl.$^7$ ................................. G06F 9/34
(52) U.S. Cl. ........................................ 719/330
(58) Field of Search ................ 395/683, 800; 709/300–305, 310–332

(56) References Cited

U.S. PATENT DOCUMENTS

| 5,613,148 A | * | 3/1997 | Bezviner et al. | 395/800 |
| 5,675,790 A | * | 10/1997 | Walls | 395/621 |
| 5,687,370 A | * | 11/1997 | Garst | 395/622 |
| 5,732,270 A | * | 3/1998 | Foody et al. | 395/683 |
| 5,742,793 A | * | 4/1998 | Sturges et al. | 395/497.01 |
| 5,778,228 A | * | 7/1998 | Wei | 709/304 |

OTHER PUBLICATIONS

Dave et al. "proxies, Application Interfaces, and Distributed Systems", IEEE Electronic Library, pp 212–220, 1992.*
Marc Shapiro, "A binding protocol for distributed shared objects", IEEE electronic library, pp. 134–141, 1994.*
Cahill et al, "The Amedeus GRT–generic runtime support for distributed persistent programming", OOPSLA '93, pp144–161, 1993.*
IBM: "SOMObjectsDeveloper Toolkit User Guide, Version 2.1 (Chapter 6)" Oct. 1994, IBM, US XP002047926.
Jacquemot C et al: "Cool: The Chorus CORBA Compliant Framework" Intellectual Leverage: Digest of Papers Of The Spring Computer Soci International Conference (Compcon), San Francisco, Feb. 28–Mar. 4, 1994, No.–, Feb. 1994, Institute of Electrical and Electronics Engineers, pp. 132–141, XP000479388.
"Distributed Object Activation and Communication Protocols" IBM Technical Disclosure Bulletin, vol. 37, No. 7, Jul. 1, 1994, pp. 539–542, XP002009565.

* cited by examiner

Primary Examiner—John Follansbee
(74) Attorney, Agent, or Firm—Thompson & Knight, L.L.P.

(57) ABSTRACT

A method and apparatus for performing distributed object calls uses proxies and memory allocation and deallocation. Specifically, an object reference to an object is obtained. The object reference is used to create a proxy handle data structure that will represent the object. The proxy handle is passed to a client application stub function which calls the object. The stub function is also passed input and output parameters along with exception information. An object request broker finds an appropriate implementation in a server application. The server application allocates memory for implementing the call. The object is implemented and the memory allocated by the server application is deallocated. The server application responds to the client, whereupon the client makes another object call using the same proxy handle or destroys the proxy handle. Multiple initialization of object calls is avoided because the object call can be initialized just once for a particular object. Moreover, resources are preserved by minimizing wild pointers and memory leaks that can occur during the calling and implementation of objects.

12 Claims, 6 Drawing Sheets

METHOD AND APPARATUS FOR PERFORMING DISTRIBUTED OBJECT CALLS USING PROXIES AND MEMORY ALLOCATION

RELATED APPLICATIONS

The following related U.S. applications are hereby incorporated by reference: U.S. application Ser. No. 08/680,270, now U.S. Pat. No. 6,263,485 entitled "Method and Apparatus for Describing an Interface Definition Language-Defined Interface, Operation, and Data Type" by A. Schofield, filed Jul. 11, 1996; U.S. application Ser. No. 08/678,681, now U.S. Pat. No. 6,321,273 entitled "Method and Apparatus Using Parameterized Vectors For Converting Interface Definition Language-Defined Data Structures into a Transport and Platform Independent Format" by A. Schofield, filed Jul. 11, 1996; U.S. application Ser. No. 08/678,298, now U.S. Pat. No. 5,943,674 entitled "Data Structure Representing An Interface Definition Language Source File" by A. Schofield, filed Jul. 11, 1996; U.S. application Ser. No. 08/680,203, now U.S. Pat. No. 5,860,072 entitled "Method and Apparatus for Transporting Interface Definition Language-Defined Data Structures Between Heterogeneous Systems" by A. Schofield, filed Jul. 11, 1996; U.S. application Ser. No. 08/678,295, now U.S. Pat. No. 6,308,225 entitled "Method and Apparatus for Performing Distributed Object Calls" by A. Schofield filed Jul. 11, 1996; U.S. application Ser. No. 08/680,202, now U.S. Pat. No. 6,253,252 entitled "Method and Apparatus for Asynchronously Calling and Implementing Objects" by A. Schofield, filed Jul. 11, 1996.

BACKGROUND OF THE INVENTION

1. Field of the Invention

The present invention relates to a method and apparatus for performing distributed object calls using proxies on the client side and memory allocation on the server side. Specifically, the method involves the creation of a proxy handle data structure to be associated with a particular object and its associated object reference. On the client side, object calls to the associated object are then made using the proxy handle, thus allowing multiple calls to the same object and eliminating the need to perform certain initialization functions each time the call is made. On the server side, the server allocates memory in a platform-independent manner.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server mode. With the client/server model, two major types of software are used: client software, which requests the information or service, and server software, which provides or implements the information or service.

Object-oriented computing is based upon the object model where pieces of code called "objects"—often abstracted from real objects in the real world—contain data (called "attributes" in object-oriented programming parlance) and may have actions (also known as "operations") performed on it. An object is defined by its interface (or "class" in C++ parlance). The interface defines the characteristics and behavior of a kind of object, including the operations that can be performed on objects of that interface and the parameters to each operation. A specific instance of an object is identified within a distributed object system by a unique identifier called an object reference.

In a distributed object system, a client application sends a request (or "object call") to a server application. The request contains an indication of the operation to be performed on a specific object, the parameters to that operation, the object reference for that object, and a mechanism to return error information (or "exception information") about the success or failure of a request. The server application receives the request and carries out the request via a server "implementation." The implementation satisfies the client's request for an operation on a specific object. The implementation includes one or more methods, which are the portions of code in the server application that actually do the work requested of the implementation. If the implementation is carried out successfully, the server application may return a response to the client. The server application may also return exception information.

To standardize distributed object systems, the Object Management Group ("OMG"), a consortium of computer software companies, proposed the Common Object Request Broker Architecture ("CORBA"). Under the CORBA standard, an Object Request Broker ("ORB") provides a communication hub for all objects in the system passing the request to the server and returning the response to the client. Commercial ORB's are known in the art and a common type is IBM's System Object Model ("SOM"). On the client side, the ORB handles requests for the invocation of a method and the related selection of servers and methods. When a client application sends a request to the ORB for a method to be performed on an object, the ORB validates the arguments contained in the request against the interface for that object and dispatches the request to the server, starting it if necessary. On the server side, the ORB uses information in the request to determine the best implementation to satisfy the request. This information includes the operation the client is requesting, what type of object the operation is being performed on, and any additional information stored for the request. In addition, the server-side ORB validates each request and its arguments. The ORB is also responsible for transmitting the response back to the client.

Both the client application and the server application must have information about the available interfaces, including the objects and operations that can be performed on those objects. To facilitate the common sharing of interface definitions, OMG proposed the Interface Definition Language ("IDL"). IDL is a definition language (not a programming language) that is used to describe an object's interface; that is, the characteristics and behavior of a kind of object, including the operations that can be performed on those objects.

IDL is designed to be used in distributed object systems implementing OMG's CORBA Revision 2.0 specification, which is incorporated by reference herein. In a typical system implementing the CORBA specification, interface definitions are written in an IDL-defined source file (also known as a "translation unit"). The source file is compiled by an IDL compiler that generates programming-language-specific files, including client stub files, server stub files, and header files. Client stub files are language-specific mappings of IDL operation definitions for an object type into procedural routines, one for each operation. When compiled by a language-specific compiler and linked into a client application, the stub routines may be called by the client application to invoke a request. Similarly, the server stub files are language-specific mappings of IDL operation definitions for an object type (defined by an interface) into procedural routines. When compiled and linked into a server application, the server application can call these routines when a corresponding request arrives. Header files are compiled and linked into client and server applications and are used to define common data types and structures.

In a system implementing the CORBA specification, object calls are made by calling the appropriate client stub function. The parameters to these stub functions typically include the input parameters for the requested operation and the object reference of the object. The CORBA specification, however, has certain performance-related drawbacks. First, each time an object is called, certain configuration operations must be performed. For instance, the object must be validated to ensure its existence. In addition, memory (or another resource) is often allocated for the call. The interface must be determined. Finally, transport of the call is prepared (e.g., opening files, preparing sockets, etc. ... ). Performing each of these operations prior to each object call can be very time-consuming. In a time-critical application, the overhead associated with each object call can significantly affect performance.

Further, on the server side, performance is affected by the improper allocation and deallocation of memory ("garbage collection"). In many distributed object systems, memory can be allocated for the implementation of an object call. Once the implementation has been performed and the server responds to the call, however, memory is not automatically deallocated. This failure to deallocate memory leads to wasted resources and, therefore, slower performances. In addition, the failure to remove pointers or addresses pointed to by pointers can lead to larger problems, such as system errors and application shutdowns.

Certain systems have attempted to use garbage collection in the implementation of object calls. Those systems, however, use platform-specific methods for deallocating memory. Thus, code portability is often sacrificed in favor of proper memory allocation and deallocation.

Accordingly, a need exists for a method for improving object call performance by eliminating the need to configure an object call each time the same object is called.

Further, a need exists for a platform-independent method for improving object call performance by allocating and deallocating memory during object implementation.

SUMMARY OF THE INVENTION

The present invention provides a method and apparatus for performing object calls that improves performance by eliminating the need to configure an object call each time the same object is called. The present invention also improves object call performance by allocating and deallocating memory during object implementation.

More particularly, the present invention is directed to a method for calling an object via a generated stub function within a client application to a server application. The call is performed by first obtaining an object reference that refers to the object. Next, the object reference is used to create a proxy handle to represent the object in calls to the object. The object is then called via the stub function. The stub function is passed the proxy handle, an input parameter of an operation to be performed on the object, an output parameter of the operation, and exception information. The object is then implemented via a method function in the server application. The server application responds to the caller and completes the call. The proxy handle may be used again for a subsequent call to the same object. Once the final object call has been made, the proxy handle is destroyed.

The creation of the proxy handle automatically allocates resources for the object call. When the proxy handle is destroyed, those resources are freed. Moreover, since the proxy handle can be used for multiple calls to the same object, the client application is not required to perform any initialization that may have been performed during the previous object calls. For instance, object validation, file opening, and socket preparation are events that are commonly performed during each object call. These initialization events may be placed in a time-critical portion of the application to save resources. Finally, multiple proxy handles may be used for the same object to force users to comply with certain requirements before implementing a particular feature of an object. In this manner, files and similar objects may be pseudo-encrypted.

In an alternative embodiment, resources may be allocated and deallocated during the actual implementation of the object. In this embodiment, the method function in the server application calls a function to allocate the appropriate resources. The function returns a pointer to memory that has been allocated on the heap in the server computer. Upon completion of the method function, the memory is automatically deallocated. Automatic deallocation of memory reduces the likelihood of random pointers and memory leaks that can often occur during the implementation of an object.

A more complete understanding of the method and apparatus for performing object calls will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

I. System Overview

Figure 1:
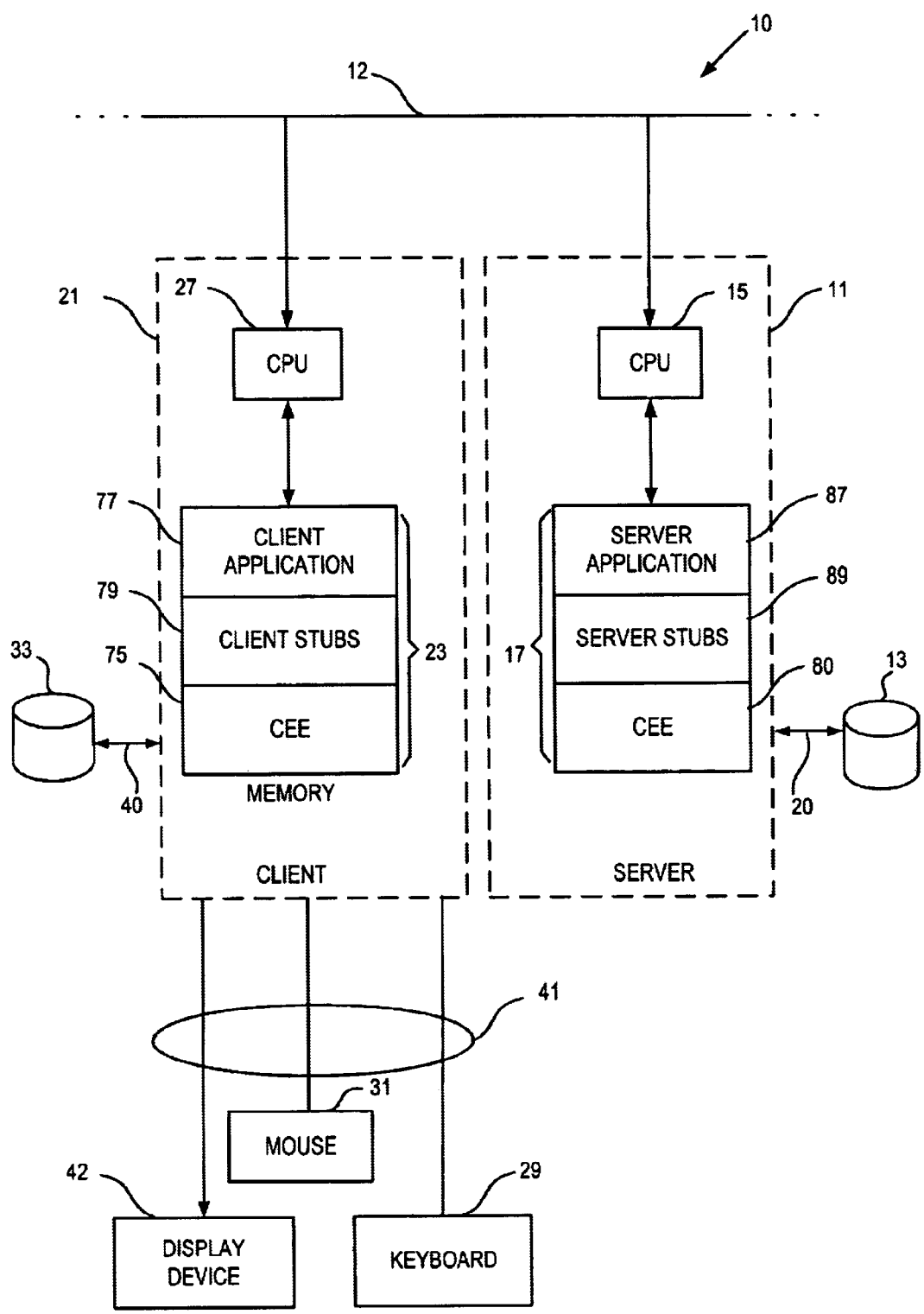
FIG. 1 is a block diagram of a client/server computing system utilizing the method of the present invention.

As illustrated in FIG. 1, the method of the present invention is designed for use in a distributed (client/server) computing environment 10. The client and server systems are connected by network connections 12, such as internet connections or the connections of a local area network. The server computer 11 communicates over a bus of I/O channel 20 with an associated disk storage subsystem 13. The server system 11 includes a CPU 15 and a memory 17 for storing current state information about program execution. A portion of the memory 17 is dedicated to storing the states and variables associated with each function of the program which is currently executing on the client computer. The client computer 21 similarly includes a CPU 27 and associated disk memory 23, and an input device 29, such as a keyboard or a mouse and a video display terminal ("VDT") 42. The client CPU communicates over a bus or I/O channel 40 with a disk storage subsystem 33 and via I/O channel 41 with the keyboard 29, VDT 42 and mouse 31. Both computers are capable of reading various types of media, including floppy disks and CD-ROMs.

The client memory 23 includes a client application 77 and client stubs 79 loaded therein. Similarly, the server memory 17 includes a server application 87 and server stubs 89. In addition, both the client memory and the server memory include an execution environment 75, 85 (as discussed below).

The client/server model as shown in FIG. 1 is merely demonstrative of a typical client/server system. Within the context of the present invention, the "client" is an application that requests that operations be performed on an object while the "server" is an application that implements the operation on the object. Indeed, both the client and server application may reside on the same computer and within a common capsule, as discussed below. Most likely, however, the client and server application will reside on separate computers using different operating systems. The method of the present invention will be discussed with reference to two capsules running on separate machines.

The method and apparatus of the present invention may be utilized within any distributed computing environment. In a preferred embodiment, the Common Execution Environment ("CEE"), which is a component of the Tandem Message Switching Facility ("MSF") Architecture is used. The CEE activates and deactivates objects and is used to pass messages between client and server applications loaded in CEE capsules. The CEE may be stored in the memory of a single machine. More likely, however, the CEE and client and server applications will be loaded on multiple machines across a network as shown in FIG. 1. The client-side CEE 75 is stored in the client memory 23. The server-side CEE 80 is stored in server memory 17.

Figure 2A:
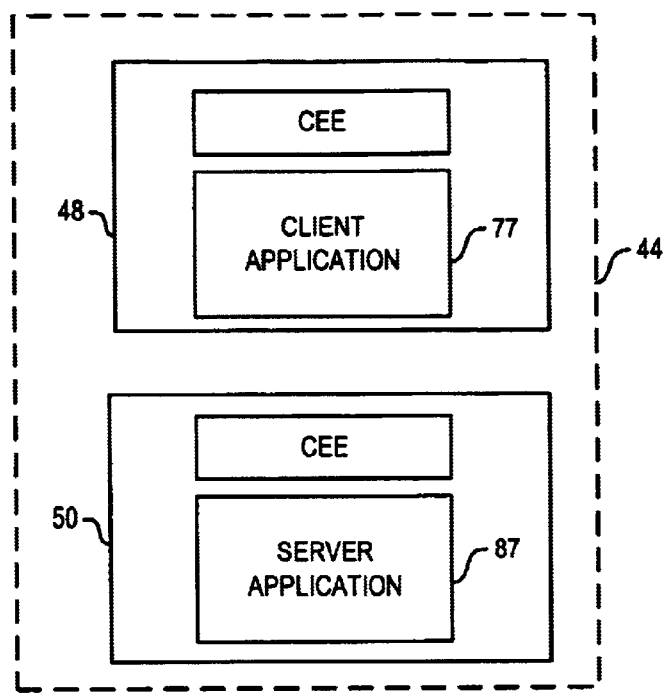
FIG. 2 is a diagram of alternative Common Execution Environment capsule configurations.
Figure 2B:
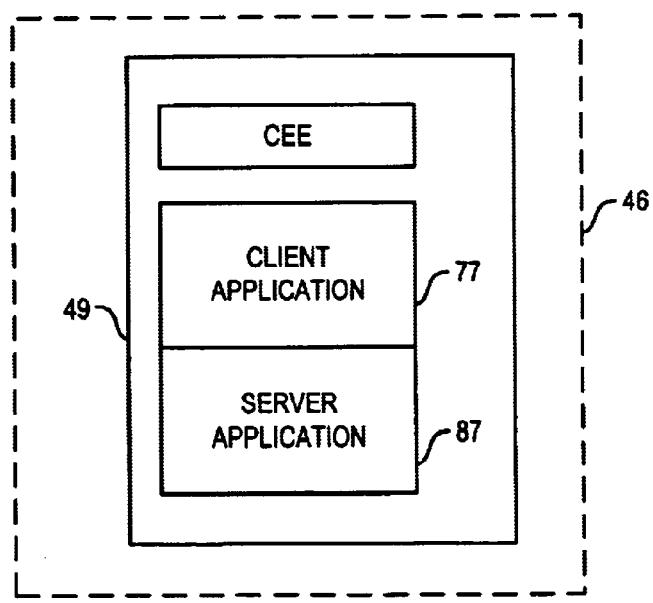

The CEE uses a "capsule" infrastructure. A capsule encapsulates memory space and execution stream. A capsule may be implemented differently on different systems depending upon the operating system used by the system. For instance, on certain systems, a capsule may be implemented as a process. On other systems, the capsule may be implemented as a thread. Moreover, client and server applications may be configured within different capsules contained on different machines as shown in FIG. 1. Alternatively, the different capsules may be configured as shown in FIG. 2. FIG. 2a shows a client application 77 loaded in a single capsule and a server application 89 may be loaded in a separate capsule 50. Both capsules, however, are stored on the same machine. Both the client and server applications may also be loaded within a single capsule 81 on the same machine 46 as shown in FIG. 2b. As stated above, the method of the present invention will be described with reference to the multiple capsule, multiple machine case. Accordingly, the client 12 and server machine 11 include a client-side CEE 75 and a server-side CEE 85 loaded in their respective memories.

Figure 3:
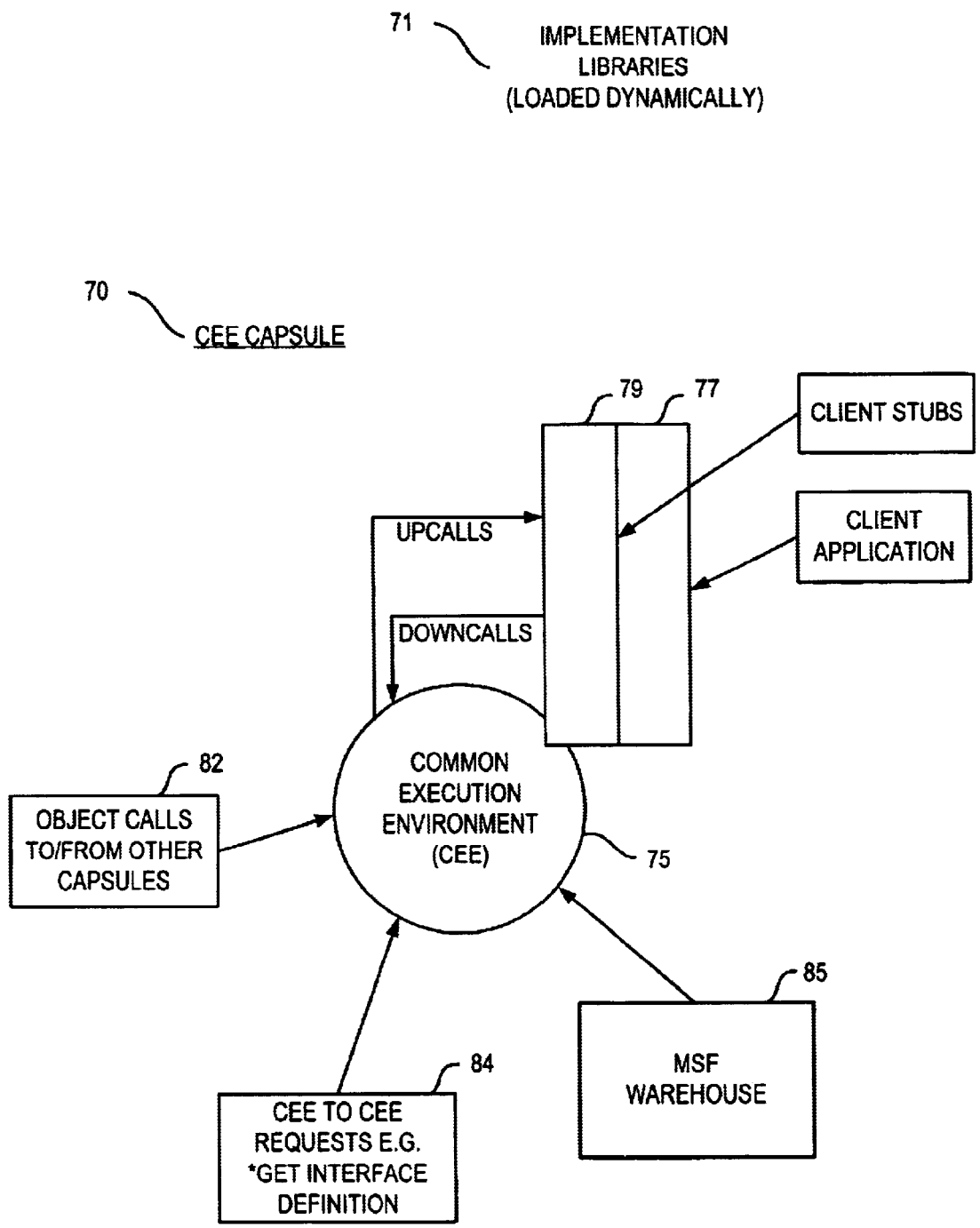
FIG. 3 is a diagram of a Common Execution Environment capsule and its core components.

FIG. 3 shows a CEE capsule 70 contained in a client computer memory 27 (not shown) that includes the CEE 75 and certain of the core CEE components and implementations of objects contained within Implementation Libraries 71. The Implementation Libraries 71 include the client application 77 (or the server application in the case of the server capsule) and client stubs 79 generated from the IDL specification of the object's interface, as described below. The Implementation Libraries 71 and the CEE 75 interact through the down-calling of dynamically-accessible routines supplied by the CEE and the up-calling of routines contained in the Implementation Library. The CEE 75 can also receive object calls 82 from other capsules within the same machine and requests 84 from other CEE's. The client-side CEE 75 and the server-side CEE 85 may communicate using any known networking protocol.

Objects implemented in a CEE capsule may be configured or dynamic. Configured objects have their implementation details stored in a repository (such as the MSF Warehouse 85) or in initialization scripts. Given a request for a specific object reference, the CEE 75 starts the appropriate capsule based on this configuration data. The capsule uses the configuration data to determine which Implementation Library to load and which object initialization routine to call. The object initialization routine then creates the object. Dynamic objects are created and destroyed dynamically within the same capsule. Dynamic objects lack repository-stored or scripted configuration information.

The following paragraphs describe a system-level view of how the Implementation Libraries interacts with the CEE 75. The CEE 75 implements requests to activate and deactivate objects within a capsule. In addition, the CEE facilitates inter-capsule object calls 82 as well as requests from other CEE's 75, as discussed above. Object activation requests arise when an object call from a client or server application must be satisfied. To activate an object, the CEE 75 loads the appropriate Implementation Library (if not already loaded) containing the object's methods and then calls a configured object initialization routine. The initialization routine specifies which interface it supports and registers the entry points of the object's methods to be called by the CEE at a later time.

When the client and server systems start, the CEE runs its own initialization. This initialization tells client and server CEE's where to locate the various Implementation Libraries. Once located by the CEE, the initialization routines in the client and server applications are called. The initialization routines contained in the client and server applications must first carry out any required application-specific initialization. Next, both the client and server initialization routines down-call a CEE function (contained in a dynamic library as stated above) called CEE_INTERFACE_CREATE to specify the object's interface. The interface description is normally generated from an IDL description of the interface contained in an IDL source file, as discussed below. CEE_INTERFACE_CREATE creates an interface and returns a handle to the newly created interface. The handle is a unique identifier that specifies the newly-created interface. The server application initialization routine then uses the interface handle to down-call CEE_IMPLEMENTATION_CREATE. CEE_IMPLEMENTATION_CREATE creates an implementation description that can be used by one or more objects. CEE_IMPLEMENTATION_CREATE returns an implementation handle that is a unique identifier specifying the implementation for each operation in the interface. Finally, the server application initialization routine uses the implementation handle to call CEE_SET_METHOD and specifies the actual addresses of specific method routines of the implementation as contained in the server application. The CEE then has sufficient information to connect object calls in the client application to specific methods in the server application.

Figure 4:
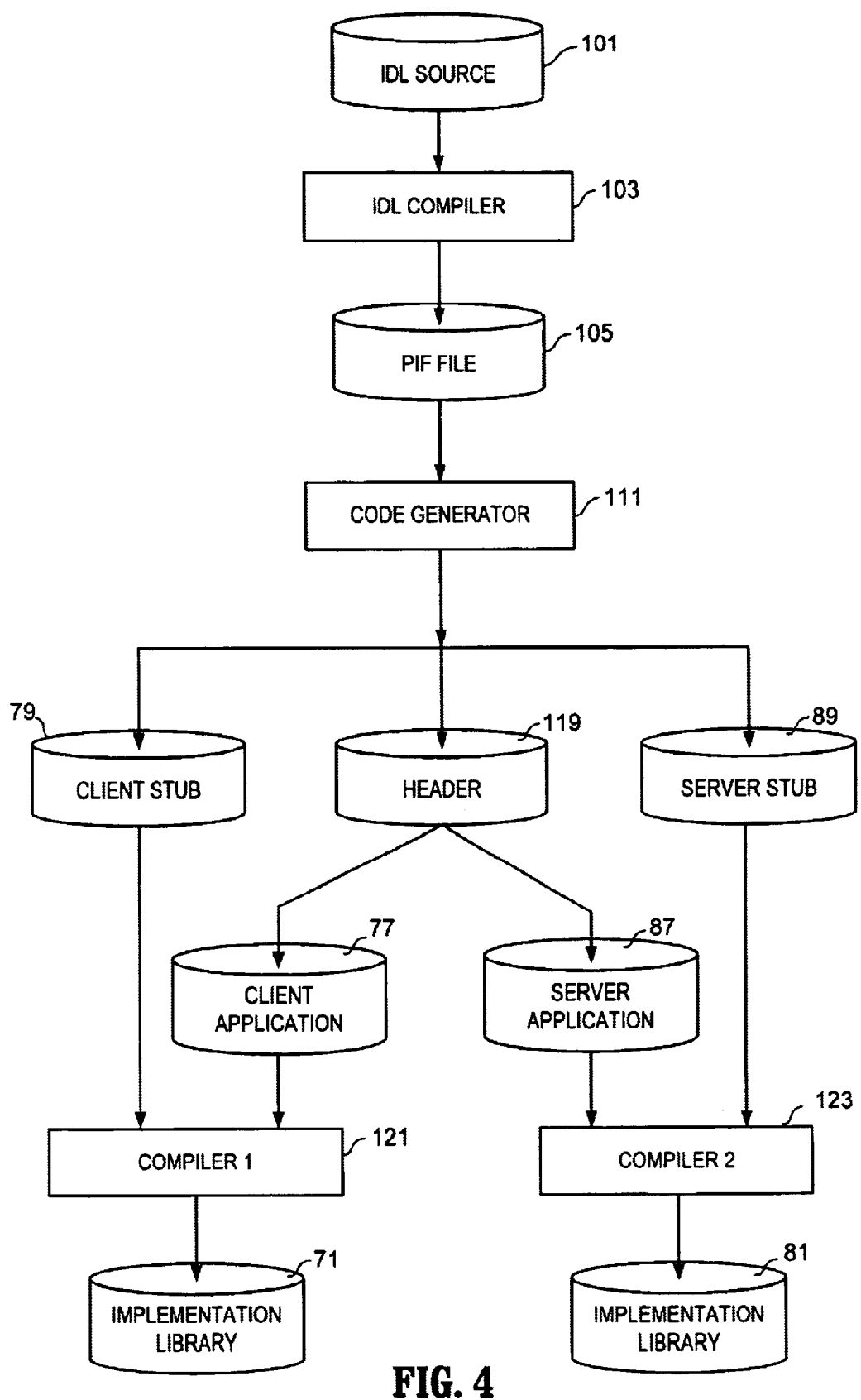
FIG. 4 is a diagram of the compilation and linking of IDL source code into client and server applications.

FIG. 4 shows how IDL source files are compiled and linked into client and server applications that will utilize the method and apparatus of the present invention. First, an IDL source file 101 is prepared containing IDL interface definitions. An IDL compiler 103 compiles the source file 101. The IDL compiler 103 parses the code 101 to produce a Pickled IDL file ("PIF") file 105 for storage of the compiled source code. A code generator 111 then parses the PIF file. The code generator 111 generates files in the language of the client and server applications. If the client and server applications are in different languages, different code generators are used. Preferably, the code generator 111 and IDL compiler 103 may be combined in a single application to produce language-specific code. The code generator 111 produces a client stub file 79 containing client stub functions and a server stub file 89 containing definitions for object implementations. The client stub functions include synchronous and asynchronous calls to the CEE. The client stub file 115 and the server stub file 89 are compiled by programming language-specific compilers 121, 123 to produce compiled client stub object code and compiled server stub object code. Similarly, a client application 77 and a server application 87 are compiled by programming-language-specific compilers to produce compiled client application object code and compiled server application object code. The client application 77 and the server application 87 also include a header file 119 generated by the code generator 111. The header file 119 contains common definitions and declarations. Finally, the compiler 121 links the client application object code and the client stub object code to produce an implementation library 71. Similarly, a second compiler links the server application object code server stub object code to produce another implementation library 81.

II. Proxy Creation

Figure 5:
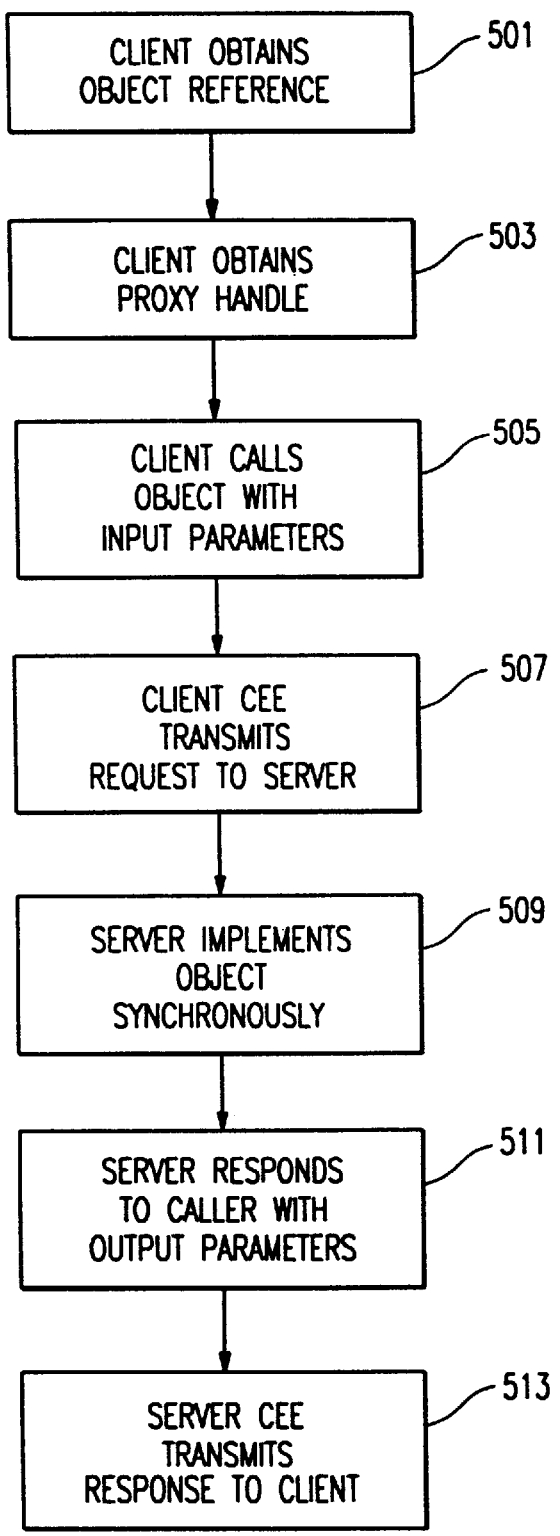
FIG. 5 is a flow chart describing the steps involved in the method of the present invention.

Now, with reference to FIGS. 5 and 6, the method of the present invention will be described. The method of the present invention will be described with reference to a client application executing in a capsule on a client computer and a server application executing in a separate capsule on a server computer. FIG. 5 is a flow chart depicting the steps involved in utilizing a proxy handle to call an object. In a first step 501, an object reference for the desired object must be obtained. The object reference may be obtained in a number of ways. Client applications usually receive the reference from configuration data, directories or invocations on other objects to which they have object references. An object reference can be converted to a string name that can be stored in files to be accessed later.

Once the object reference has been obtained, the object call may be performed. In the method of the present invention, the object call is performed by first obtaining a "proxy handle" to the object reference. The proxy handle is a unique identifying data structure (a "proxy object") for a particular object reference. The proxy structure contains information about an object and calls to that object. Calls can be made to the specified object using the proxy handle. The proxy handle facilitates calls to the same object and prevents overhead that occurs in multiple calls to the same object. By creating a proxy handle via which object calls can be made, certain initialization routines may be performed once through the proxy handle while allowing multiple calls to the proxied object. In addition, the proxy handle facilitates the use of asynchronous calls to an object (discussed below). In a preferred embodiment, a proxy handle is created in step 503 by down-calling the client-side CEE function, CEE_PROXY_CREATE, in the client application. That function is defined in the C programming language as follows:

```
CEE_PROXY_CREATE (
    const char    *objref,
    const char    *intf_handle,
    char          *proxy_handle);
```

The function receives the object reference, objref, and an interface handle, inf_handle, and returns a proxy handle identifying the newly created proxy object. As discussed above, in connection with FIG. 3, an interface must be created for each object. An interface defines the operations available for a collection of similar objects. The interface is defined in IDL and compiled and linked into a client application. The client application calls CEE_INTERFACE_CREATE in its initialization routine to specify the interface. The client-side CEE returns an interface handle that can be used to create any number of objects or proxies.

In a preferred embodiment of the present invention, the proxy object is represented by a structure containing the following fields:

link;
call_link;
self;
nor;
state;
call_active;
destroy;
lock_count;
call_compl_rtn;
call_compl_tag1;
call_compl_tag2;
call_compl_sts;
operation_idx;
*client_allocated_params;
*server_allocated_params;
*obj;
operation_idx_table;
max_response_size;
*req_area;
*rsp_area;
*rsp_param_buf;
ochan;

Each of the components of the proxy object data structure will now be discussed. The addresses and values stored in each of these components is modified by the client-side CEE with each call to the object referred to by the proxy structure. The client-side CEE maintains a linked list of proxy structures. The link member of each proxy structure contains a pointer to the next entry in this list of proxy structures.

In a preferred embodiment, object calls can be either synchronous (client application requests that an operation be performed on an object and waits for a response) or asynchronous (client application requests that an operation be performed on an object and continues to do other work). When asynchronous object calls are dispatched in the same capsule, each call is queued onto a linked list contained in an object structure that exists for every object when activated. The call_link parameter is a link to the list of calls. The self member is the handle of this particular proxy structure. This handle is returned to the client during CEE_PROXY_CREATE.

The object reference passed to CEE_PROXY_CREATE is stored in the nor member. The state parameter indicates whether the proxy structure includes a pointer to an internal object structure, an external object (via a client port), or a non-existing object structure (is stale). If the proxy is internal, a pointer to the object is contained in the obj parameter. If the object is in a different capsule, the ochan parameter contains a pointer to a client port handle or other information required to communicate with the object.

The call_active member holds a true/false value. The call_active member is set to true if an object call is outstanding for this particular proxy handle. Only one object call can be outstanding on a given proxy. The lock_count member is incremented to prevent the proxy structure from being destroyed. It is decremented when the structure is no longer needed. The destroy member is a true/false value that is set to true if this proxy structure should be destroyed when lock_count drops to zero. The intf member is the address of the inf structure that describes the interface (discussed above).

The next four structure members, call_compl_rtn, call_compl_tag1, call_compl_tag2, call_compl_sts, are used to implement asynchronous object calls. Asynchronous calls to an object in a server application are made by passing the address of a completion routine to the client stub function when called. The client stub function, in turn, calls the client-side CEE and provides the completion function address. The client-side CEE stores the completion function address in the proxy structure upon creation of the proxy handle. When the object call completes, the client-side CEE calls the completion routine specified in the proxy handle. The routine is called to notify the client application that the call has completed. While the object is being implemented, the client application can continue performing other functions. The member call_compl_rtn contains the address of the completion routine. Since multiple calls may be made to the same proxied object, the client application can identify the call by using the call_compl_tag1 parameter when the object call is made. The call_compl_tag1 identifier is passed to the client stub function. These identifiers are specified in the proxy structure by the members call_compl_tag1 and call_compl_tag2. The call_compl_sts indicates the call completion status for asynchronous calls that could not be called.

The operation_idx member specifies which of the object's operations is to be called. Operation identifiers are generated by the code generator for each operation in the interface. The allocated_params member is a pointer to the parent of temporarily allocated parameters (used for unbounded types and the like). The deallocation of this member performs garbage collection on the next call to the object referenced by this proxy structure. The operation_idx_table parameter is a pointer to an operation index translation table that is used only if the object is contained in the same capsule.

Memory allocation is performed utilizing the max_response_size, req_area, rsp_area, and rsp_param_buf members. The rsp_param_buf member points to a buffer containing the response parameters. The next time that this proxy object is used, the buffer will be deallocated. The max_response_size member is the maximum expected response size. This is used to allocate the rsp_area member. The req_area member points to an area structure that will be used for the request. The rsp_area points to an area structure that will be used for the response to the object call. The area structure contains the following fields, as defined in C:

desc;
*data;
curlen;

The area structure contains an object call area descriptor and a pointer to data and the current length of that data.

The call by the client application to CEE_PROXY_CREATE causes the client-side CEE to automatically allocate memory for the object call in step 508. Memory in the client computer is allocated along with any additional resources necessary for making the call. Once the proxy handle is destroyed (through a down-call to CEE_PROXY_DESTROY, discussed below), the memory and any allocated resources are freed. Memory allocated for variable-sized output parameters from an object call are deallocated when the next object call is made using the same proxy handle.

The proxy handle is used to make all subsequent calls to the object referred to by the proxy. The object call is made in step 511 by calling the appropriate stub function in the client application and passing the proxy handle and input and output parameters along with exception information to the function. The stub function, in turn, down-calls CEE_OBJECT_CALL, defined in C as follows:

```
CEE_OBJECT_CALL (
    const char      *proxy_handle,
    long            operation_idx,
    void            **param_vector);
```

The proxy handle is specified by the proxy handle parameter. The parameter operation_idx specifies which of the object's methods is to be called. This parameter is an index to the required method in the interface description that was supplied when the interface was created. Finally, the param_vector parameter is an array of pointers to the object call's input parameters, output parameters, and exception structure. The address of the exception structure is the first element in the array. If the operation is not of type void, then the following element contains the address of the variable to receive the operation's result. Subsequent elements contain the addresses of the operation's input and output parameters in the same order as they were defined in IDL.

The call is then transported to the server using any transport mechanism. In step 515, the server application implements the object. This is performed by the server-side CEE which up-calls the appropriate method routine. The method routine is passed the param_vector parameter containing the addresses of all the input and output parameters. When the method exits, a response is sent to the caller in step 519 and the object call is complete.

Once the first call has completed, the proxy handle may be used again to make further calls to the same object. Each subsequent call to the object may be made without validating the object or performing other start-up operations. Thus, the proxy creation step can be placed in a non-time-critical portion of the client application and object calls can be made in a time-critical portion of the application.

Following the final object call for a specified proxy handle, the proxy handle is destroyed in step 521. This is accomplished by calling CEE_PROXY_DESTROY in the client application, defined in C as follows:

```
CEE_PROXY_DESTROY (
    const char    *proxy_handle);
```

The proxy handle is passed to the function. The client-side CEE destroys the proxy handle and frees all previously-allocated resources for the proxy handle in step 528. Alternatively, an object call may be canceled and all of the resources associated with the call may be deallocated by destroying the proxy while the call is outstanding.

III. Proxy Creation And Memory Allocation

Figure 6:
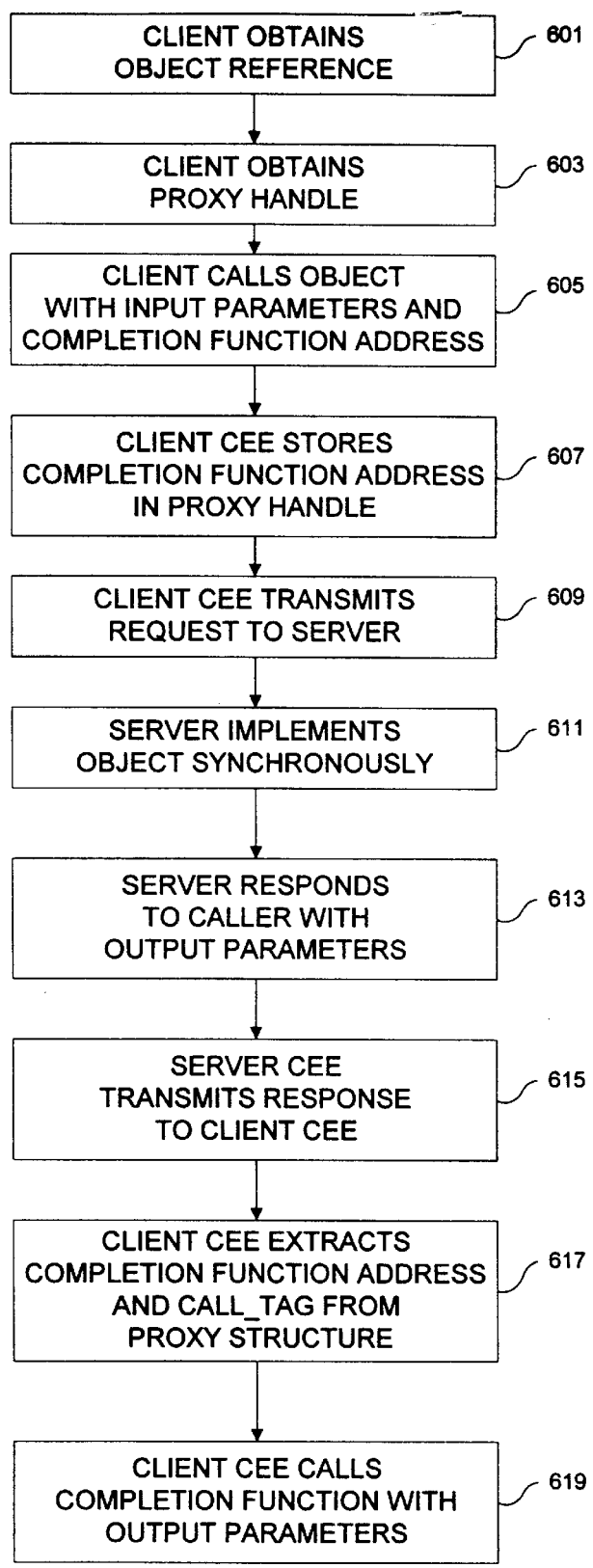
FIG. 6 is a flow chart describing the steps involved in an alternative embodiment of the method of the present invention.

FIG. 6 shows an alternative embodiment of the object call method of the present invention. In this embodiment, memory is allocated during the implementation of the object as well as during the object call.

Steps 601–611 are similar to the steps described above. Thus, in step 601, an object reference is obtained. Next, a proxy handle is obtained by down-calling CEE_PROXY_CREATE which returns the proxy handle. The object call is then made in step 611 using CEE_OBJECT_CALL, which is passed the proxy handle of the referenced object.

In step 613, the server-side CEE up-calls the appropriate method routine in the server application. The method routine, in step 616 when called, down-calls a server-side CEE function to allocate memory. That function, CEE_TMP_ALLOCATE is defined in C as follows:

```
CEE_TMP_ALLOCATE (
    const char    *call_id,
    long          len,
    void          **ptr);
```

The function uses the call_id parameter to track a particular object call. Each call to the object is given a unique call_id by the server application. Thus, once the call is made, the server implementation provides an id for the call in the call_id parameter. The number of bytes to allocate is specified in the len parameter. The function returns the address of the allocated memory through the ptr parameter.

The object's method is performed by the server application in step 619. The server application responds to the caller in step 615. Upon exiting the method function, the memory allocated under the down-call to CEE_TMP_ALLOCATE is freed in step 620. The client application then makes another object call in step 611 or destroys the proxy handle in step 625. If the proxy handle is destroyed, the memory allocated in step 609 is automatically deallocated by the client-side CEE in step 628.

Memory can be prematurely deallocated using CEE_TMP_DEALLOCATE. That function is defined as:

```
CEE_TMP_DEALLOCATE (
    In     void     *ptr);
```

The function is passed the ptr parameter that was provided by CEE_TMP_ALLOCATE. The CEE frees the address pointed to by that parameter.

Having thus described a preferred embodiment of a method for making object calls using proxies and memory allocation/deallocation, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer-implemented method for performing object calls from a client to a server, comprising the steps of:

obtaining an object reference, wherein an object reference uniquely identifies an instance of an object;

using the object reference to create a proxy handle data structure, wherein the proxy handle data structure comprises information about the object and calls to the object;

performing an initialization routine through the proxy handle data structure;

performing multiple calls to the object after a single performance of the initialization routine;

allocating resources after a call to the object; and automatically deallocating at least a portion of the resources after implementation of the call to the object.

2. The method of claim 1, wherein the proxy handle data structure comprises:

a link to a list of calls;

a pointer to an object structure;

an indication whether the pointer to an object structure is a pointer to an internal object structure or an external object structure;

if the pointer to an object structure is a pointer to an external object structure, the proxy handle data structure further comprises a pointer to information required to communicate with the external object structure; and an indication whether an object call is outstanding for the proxy handle data structure.

3. The method of claim 2, wherein the multiple calls comprises asynchronous calls, and wherein the proxy handle data structure further comprises:

an address of a completion routine;

when multiple calls are made to object, the proxy handle data structure further comprises an indication of an identity of a call; and an indication of a call completion status.

4. The method of claim 3, wherein the step of creating a proxy handle data structure comprises automatically allocating resources for an object call.

5. The method of claim 4, wherein the resources automatically allocated include memory, and wherein the proxy handle data structure further comprises:

a pointer to a buffer containing response parameters for the object call;

an indication of a maximum expected response size;

a pointer to an area structure that will be used for the object call; and a pointer to an area structure that will be used for a response to the object call.

6. The method of claim 5, wherein the resources allocated for the object call are automatically deallocated when the object call is responded to.

7. The method of claim 3, wherein an object call is asynchronous, and wherein an object being called is in an application of the server, further comprising the steps of:

passing an address of a completion routine to a client stub function;

the client stub function providing a completion function address;

storing the completion function address in the proxy handle data structure; and when the object call completes, calling the completion routine, wherein the client may continue performing functions not related to the object call while the object call is being performed.

8. The method of claim 1, further comprising the steps of:

determining whether the client will make another call to the object;

if the client will not make another call to the object, destroying the proxy handle data structure; and deallocating any resources that were automatically allocated when the proxy handle data structure was created.

9. A computer-readable medium having embodied thereon instructions, which when executed by a computer in a multi-processor, distributed object system, cause the performance of the following steps:

obtaining an object reference, wherein an object reference uniquely identifies an instance of an object;

using the object reference to create a proxy handle data structure, wherein the proxy handle data structure comprises information about the object and calls to the object;

performing an initialization routine through the proxy handle data structure;

performing multiple calls to the object after a single performance of the initialization routine wherein, the multiple calls comprise asynchronous calls;

allocating resources after a call to the object; and automatically deallocating at least a portion of the resources after implementation of the call to the object.

10. The computer-readable medium of claim 9, wherein the instructions further cause resources required for the object call to be automatically allocated during the step of creating a proxy handle data structure.

11. The computer-readable medium of claim 10, wherein the instructions, when executed, further cause the performance of the following steps:

determining whether a client processor will make another call to the object;

if the client processor will not make another call to the object, destroying the proxy handle data structure; and deallocating any resources that were automatically allocated when the proxy handle data structure was created.

12. The computer-readable medium of claim 11, wherein the proxy handle data structure comprises:

a link to a list of calls;

a pointer to an object structure;

an indication whether the pointer to an object structure is a pointer to an internal object structure or an external object structure;

if the pointer to an object structure is a pointer to an external object structure, the proxy handle data structure further comprises a pointer to information required to communicate with the external object structure;

an indication whether an object call is outstanding for the proxy handle data structure;

an address of a completion routine; when multiple calls are made to the proxy handle.

* * * * *